Feb. 7, 1950     T. NORDENSKJÖLD ET AL     2,496,557
PROCESS FOR THE TREATMENT OF MASSES
CONTAINING CHOCOLATE
Filed Dec. 16, 1946
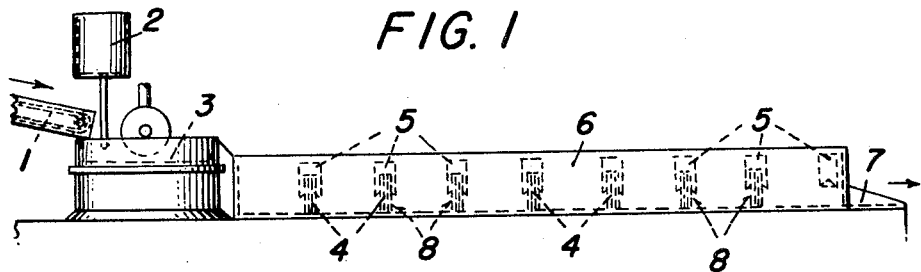
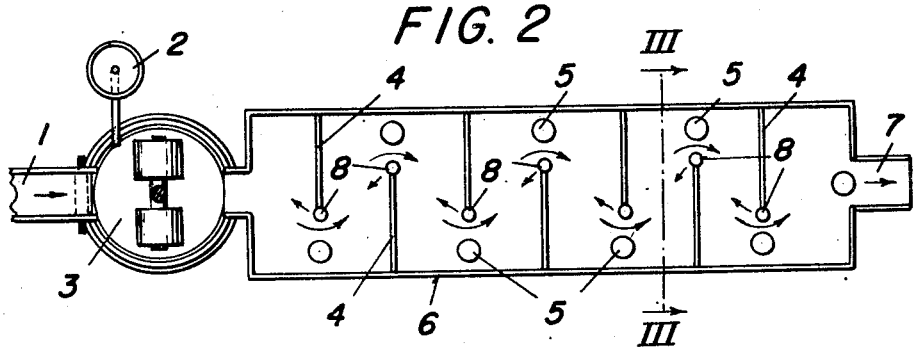
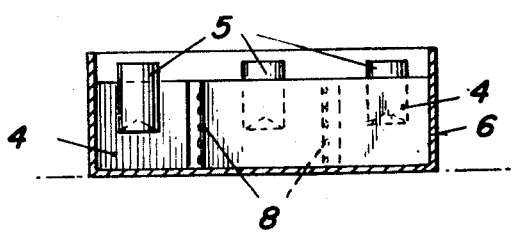
Inventor
TORE NORDENSKJÖLD
KNUT SIXTEN HOLMQUIST
By Baily, Stephens & Huettig
Attorneys Patented Feb. 7, 1950

2,496,557

UNITED STATES PATENT OFFICE 2,496,557

PROCESS FOR THE TREATMENT OF MASSES CONTAINING CHOCOLATE

Tore Nordenskjöld, Malmo, and Knut Sixten Holmquist, Stockholm, Sweden

Application December 16, 1946, Serial No. 716,634 In Sweden April 1, 1942

Section 1, Public Law 690, August 8, 1946 Patent expires April 1, 1962

6 Claims. (Cl. 99—23)

The present invention relates to an improved process for the treatment of masses containing chocolate and other products derived from cacao beans, in the following referred to under the broad term "chocolate masses" and more particularly concerns the treatment known as "conching."

In the preparation of chocolate masses the raw materials are subjected to a number of operations. It is known that the particle size of the mass is of great importance in these operations, particularly in connection with the treatment of such masses in so-called "conches" (conching apparatus), this conching treatment being the final operation adapted to develop the desired qualities of the mixture. It is, therefore, the conching which, above all, is of importance in the preparation of a chocolate mass which in its taste, smoothness, consistency and outer appearance is well suited for the manufacture of high grade chocolate products. However, prior to the conching, the mass should be treated in such a manner that the particle size thereof is reduced to the greatest possible extent, as this will materially aid in shortening and simplifying the conching process proper. This reduction of the particle size is effected in roller mills particularly built for chocolate production purposes. The conching proper is intended to produce a chemical as well as a physical transformation of the mass. Moisture is removed, a suspension or dispersion of particles of sugar, grains of cacao, milk powder and other possible additions is obtained in liquid cocoa butter or other added fats, and an oxidation and partial depolymerization takes place. These processes are of a decided importance for the taste, consistency, stability and appearance of the finished product. The machines previously employed for effecting the above mentioned changes, however, have an unsatisfactory efficiency. Even though high temperatures, various emulsifying agents and special oxidizing substances are employed, it is rarely possible to reduce the time for treatment of a quality chocolate mass below eighteen hours.

It is the object of the present invention to simplify and shorten the conching process while at the same time producing a superior product.

In accordance with the invention this object is realized by subjecting chocolate masses, preferably, after a treatment in roller mills or similar known preparatory operation, and prior, during or after the conching, to the influence of ultrasonic waves (mechanical vibrations) with a frequency of the order of at least 15 kilocycles per second (15 thousand oscillations per second).

It has been found that by subjecting chocolate masses of various qualities and modes of preparation to ultrasonic oscillations of various frequencies and intensities it is possible to effect (1) A reduced particle size in suspension
(2) Higher stability of the product
(3) More speedy depolymerization
(4) More rapid oxidation than in masses which are conched in the usual manner. The process in accordance with the invention, furthermore, considerably reduces the time necessary for conching and yields a product with better homogeneity, appearance and taste.

The ultrasonic oscillations may be produced according to known methods by means of magneto-striction or piezo-electric action, and the equipment by means of which the oscillations are transmitted and brought to act upon the chocolate mass may be of any suitable construction. For example, the equipment may be constructed so that the mass is brought in contact with a bar or rod-shaped device which is caused to oscillate with an ultrasonic frequency or the bottom or side walls of the conching container may be caused to oscillate with such frequencies with the aid of known devices for producing ultrasonic oscillations. The temperature during the ultrasonic treatment may vary within the same limits as in ordinary chocolate treatment, that is, from room temperature up to about 150° C. The effect of the ultrasonic oscillations may be increased by dispersing air in the chocolate mass before or during the treatment.

*Example*

A chocolate mass having the following composition 44.5% by weight of ground cacao beans
45.0% sugar
10.0% cocoa butter
0.5% tecithin was prepared by mixing and rolling the ground cacao beans, sugar and lecithin in the usual manner (5-roller mill) and after rolling working up the mixture with the cocoa butter. The worked up mass was thereafter conched with the aid of ultrasonic oscillations with a frequency of 327 kilocycles per second. The worked up mass which at the beginning had a temperature of only 31° C. increased its temperature during the conching, without the addition of external heat, to 41° C. after five (5) minutes of ultrasonic treatment and to 58° C. after thirty (30) minutes treatment. After this time the mass was ready for use for example for "dipping" of so-called pralines (chocolate covered fillings). A normal charge amounts to 1500 lbs. or even multiples thereof.

An example of a suitable embodiment of a continuously operating conching apparatus according to the invention is shown in the accompanying diagrammatic drawing in which Figure 1 shows the apparatus seen from the side;

Figure 2 is a view of the apparatus seen from above, and

Figure 3 is an enlarged vertical section of Figure 2 through line III—III seen in the direction of the arrows.

Referring to the drawings, band-conveyor 1 serves to deliver a rolled chocolate mixture to the working up machine 3 which may for example consist of an edge mill of the usual type to which cocoa butter is added from container 2. From the edge mill the mass is continuously fed to the conching apparatus proper which consists of an elongated container 6 in which a number of screens or baffles 4 are arranged, past which the mixture slowly flows in a zig-zag path through the container from the working up appliance 3 to the exit where it is removed as a finished product. Air injectors 8 are provided at suitable points, preferably near the edges of baffles 4, whereby air or other suitable gases, for example, oxygen, oxidising or reducing gas mixtures, carbon dioxide and the like, may be introduced in a finely divided state as a dispersion in the chocolate mass. The air or other gases are preferably injected into the chocolate mass in the direction shown by the small arrows. Ultrasonic oscillators 5 are arranged in the path of the chocolate mass flowing past the baffles as indicated by the curved arrows so that they will influence the mass, whereby the introduced gases are driven out again at the same time that the mass undergoes other transformations caused by the ultrasonic treatment. In the apparatus shown in the drawings, the parts transmitting the ultrasonic oscillations consist of vertical bars provided with cut-out portions at the lower end in order that good contact with the chocolate mass is obtained. These details may, of course, be varied in a number of ways within the scope of the invention.

The chocolate mass is as a rule sufficiently easy-flowing that it will flow by itself through container 6 from the higher inlet to the lower outlet 7, but it is evident that special means may be employed, if desirable, to convey the mass through the apparatus. The apparatus is chiefly intended for continuous operation but the feeding and conveying of the mass as well as the ultrasonic treatment may be made intermittent if desired.

While we have described herein certain embodiments of our invention, we wish it to be understood that we do not intend to limit ourselves thereby except within the scope of the appended claims.

We claim:

1. In a process for the improvement of chocolate masses which includes a conching treatment of such masses, the step which comprises subjecting such masses to the influence of mechanical oscillations with a frequency of the order of at least 15 kilocycles per second.

2. In a process for the improvement of chocolate masses which includes a conching treatment of such masses, the step which comprises dispersing a gas selected from the group consisting of air, oxygen, and carbon dioxide in such masses and subjecting such masses to the influence of mechanical oscillations with a frequency of the order of at least 15 kilocycles per second.

3. In a process for the improvement of chocolate masses which includes a conching treatment of such masses, the step which comprises dispersing air in such masses and subjecting such masses to the influence of mechanical oscillations with a frequency of the order of at least 15 kilocycles per second.

4. A continuous process for the conching of chocolate masses which comprises causing said masses to flow through an elongated path and subjecting said masses to the influence of mechanical oscillations of the order of at least 15 kilocycles per second while flowing through said path.

5. A continuous process for the conching of chocolate masses which comprises causing said masses to flow through an elongated path injecting a gas selected from the group consisting of air, oxygen, and carbon dioxide in a finely divided state into the flowing masses and in a direction countercurrent to the flow of said masses and subjecting said masses to the influence of mechanical oscillations of the order of at least 15 kilocycles per second while flowing through said path.

6. In a process for the improvement of chocolate masses which includes a conching treatment of such masses, the step which comprises subjecting such masses to the influence of mechanical oscillations with a frequency of the order of at least 15 kilocycles per second at a temperature between room temperature and 150° C.

TORE NORDENSKJÖLD.
KNUT SIXTEN HOLMQUIST.

REFERENCES CITED

The following references are of record in the file of this patent:

UNITED STATES PATENTS

| Number | Name | Date |
|---|---|---|
| 1,977,300 | Blunt | Oct. 16, 1934 |
| 2,219,348 | Turner | Oct. 29, 1940 |
| 2,348,473 | Hollstein | May 9, 1944 |
| 2,356,181 | Rubens | Aug. 22, 1944 |

FOREIGN PATENTS

| Number | Country | Date |
|---|---|---|
| 332,533 | Great Britain | of 1930 |